United States Patent
Fan et al.

(10) Patent No.: US 12,348,822 B2
(45) Date of Patent: Jul. 1, 2025

(54) SYSTEM, METHOD AND COMPUTER-READABLE MEDIUM FOR VIDEO PROCESSING

(71) Applicant: 17LIVE Japan Inc., Tokyo (JP)

(72) Inventors: Yu-Cheng Fan, Taipei (TW); Yung-Chi Hsu, Taipei (TW); Hsing-Yu Tsai, Taipei (TW)

(73) Assignee: 17LIVE Japan Inc., Tokyo (JP)

( * ) Notice: Subject to any disclaimer, the term of this patent is extended or adjusted under 35 U.S.C. 154(b) by 0 days.

(21) Appl. No.: 18/364,952

(22) Filed: Aug. 3, 2023

(65) Prior Publication Data

US 2024/0259644 A1    Aug. 1, 2024

(30) Foreign Application Priority Data

Jan. 30, 2023    (JP) .................. 2023-011798

(51) Int. Cl.
*H04N 21/4788* (2011.01)
*H04N 21/2187* (2011.01)

(52) U.S. Cl.
CPC ..... *H04N 21/4788* (2013.01); *H04N 21/2187* (2013.01)

(58) Field of Classification Search
None
See application file for complete search history.

(56) References Cited

U.S. PATENT DOCUMENTS

| | | | | |
|---|---|---|---|---|
| 10,616,666 | B1* | 4/2020 | Pontiff | H04N 21/8545 |
| 2019/0052928 | A1* | 2/2019 | Zabetian | G06F 16/7867 |
| 2021/0402294 | A1* | 12/2021 | Kanaya | A63F 13/87 |
| 2022/0021939 | A1* | 1/2022 | Mizuta | H04N 21/25866 |
| 2022/0377426 | A1* | 11/2022 | Wei | H04N 21/4438 |
| 2023/0042609 | A1* | 2/2023 | Zhang | H04N 21/4312 |
| 2023/0119404 | A1* | 4/2023 | Otsuka | H04N 21/258 725/86 |

FOREIGN PATENT DOCUMENTS

| | | | |
|---|---|---|---|
| CN | 113824984 A | 12/2021 | |
| JP | 2020017870 A * | 1/2020 | ......... H04N 21/2187 |
| JP | 2020-107264 A | 7/2020 | |
| JP | 2021057686 A * | 4/2021 | |
| JP | 2022-102152 A | 7/2022 | |

OTHER PUBLICATIONS

"How to Donate/Tip on Twitch"; Mar. 2022. (Year: 2022).*
Notification of Reasons for Refusal dated Jun. 27, 2023, issued in corresponding Japanese Patent Application No. 2023-011798, with English translation (8 pgs.).

* cited by examiner

*Primary Examiner* — Junior O Mendoza
(74) *Attorney, Agent, or Firm* — Chun-Ming Shih; hdls ipr services

(57) ABSTRACT

The present disclosure relates to a system, a method and a computer-readable medium for video processing. The method includes receiving a gifting signal from a user terminal; obtaining a first video of a distributor from a first timing in response to receiving the gifting signal; generating a second video by overlapping an effect corresponding to the gifting signal onto the first video at a second timing, wherein the second timing is later than the first timing.

8 Claims, 18 Drawing Sheets

Stream DB 310

| Stream ID | Distributor ID | Viewer ID | Address |
|---|---|---|---|
| ST22 | 001A | SS5, SS12, SS43 | XXX |
| ST92 | 002B | TT3, TS2 | YYY |
| ... | ... | ... | ... |

FIG. 4

User DB 312

| User ID | Points |
|---------|--------|
| 001A | 3243 |
| 002B | 2510 |
| SS5 | 1803 |
| ... | ... |

FIG. 5

Gift DB 314

| Gift ID | Awarded points | Price points | Best moment tag | Effect link |
|---|---|---|---|---|
| TT01 | 90 | 100 | No | AAA |
| TE01 | 180 | 200 | Yes | BBB |
| WTS10 | 40 | 50 | No | CCC |
| ... | ... | ... | ... | ... |

FIG. 6

Mix video DB 352

| Mix video ID | Distributor ID | Gifting viewer ID | Shared user ID | Mix video file link | Expiration date |
|---|---|---|---|---|---|
| MV19 | D18 | V27 | V1, V76 | link_xx | date_xx |
| MV08 | D75 | V19 | V14, V187 | link_yy | date_yy |
| ... | ... | ... | ... | | |

FIG. 14

SYSTEM, METHOD AND COMPUTER-READABLE MEDIUM FOR VIDEO PROCESSING

CROSS-REFERENCE TO RELATED APPLICATIONS

This application is based on and claims the benefit of priority from Japanese Patent Application Serial No. 2023-011798 (filed on Jan. 30, 2023), the contents of which are hereby incorporated by reference in its entirety.

TECHNICAL FIELD

The present disclosure relates to video processing in the streaming field.

BACKGROUND

Real time interaction on the Internet, such as live streaming service, has become popular in our daily life. There are various platforms or providers providing the service of live streaming, and the competition is fierce. It is important for a platform to fulfill the need of its users to achieve better interaction experience.

China patent application publication CN113824984A discloses a method for displaying gifting information in a live stream.

SUMMARY

A method according to one embodiment of the present disclosure is a method for video processing being executed by one or a plurality of computers, and includes: receiving a gifting signal from a user terminal; obtaining a first video of a distributor from a first timing in response to receiving the gifting signal; generating a second video by overlapping an effect corresponding to the gifting signal onto the first video at a second timing, wherein the second timing is later than the first timing.

A system according to one embodiment of the present disclosure is a system for video processing that includes one or a plurality of processors, and the one or plurality of computer processors execute a machine-readable instruction to perform: receiving a gifting signal from a user terminal; obtaining a first video of a distributor from a first timing in response to receiving the gifting signal; generating a second video by overlapping an effect corresponding to the gifting signal onto the first video at a second timing, wherein the second timing is later than the first timing.

A computer-readable medium according to one embodiment of the present disclosure is a non-transitory computer-readable medium including a program for video processing, and the program causes one or a plurality of computers to execute: receiving a gifting signal from a user terminal; obtaining a first video of a distributor from a first timing in response to receiving the gifting signal; generating a second video by overlapping an effect corresponding to the gifting signal onto the first video at a second timing, wherein the second timing is later than the first timing.

BRIEF DESCRIPTION OF THE DRAWINGS

FIG. 4 is a data structure diagram of an example of the stream DB 310 of FIG. 3.

FIG. 5 is a data structure diagram showing an example of the user DB 312 of FIG. 3.

FIG. 6 is a data structure diagram showing an example of the gift DB 314 of FIG. 3.

FIG. 14 is a data structure diagram showing an example of the mix video DB 352 of FIG. 3.

DETAILED DESCRIPTION

Hereinafter, the identical or similar components, members, procedures or signals shown in each drawing are referred to with like numerals in all the drawings, and thereby an overlapping description is appropriately omitted. Additionally, a portion of a member which is not important in the explanation of each drawing is omitted.

Conventionally, content providers (such as distributors, broadcasters, streamers, livers or anchors) on the internet (such as streaming platforms or live streaming platforms) do not have good tools for identifying the time (e.g., timing or time span) to perform the content distribution. The distributors cannot know when to perform the distribution to achieve higher rewards (such as revenue) in an efficient manner.

The present disclosure provides systems or methods to analyze the viewers and the distributors, to identify the best or the most profitable time for a distributor to distribute contents.

Figure 1:
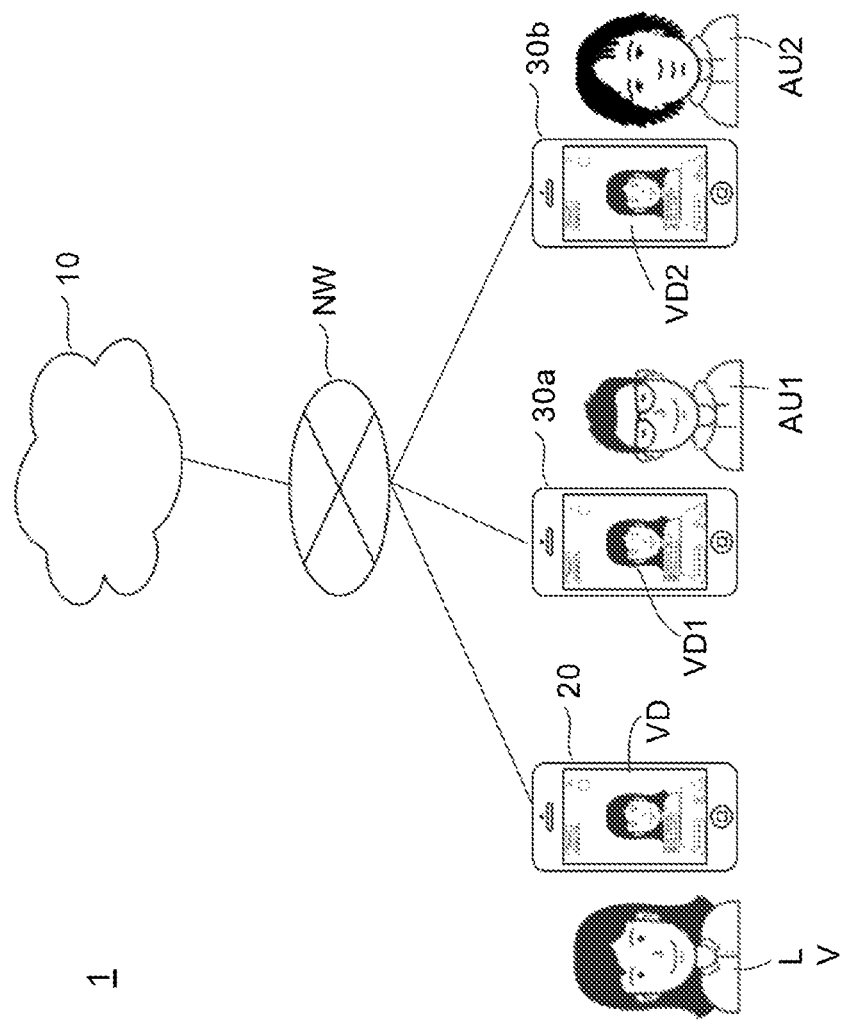
FIG. 1 shows a schematic configuration of a live streaming system 1 according to some embodiments of the present disclosure.

FIG. 1 shows a schematic configuration of a live streaming system 1 according to some embodiments of the present disclosure. The live streaming system 1 provides a live streaming service for the streaming streamer (could be referred to as liver, anchor, or distributor) LV and viewer (could be referred to as audience) AU (AU1, AU2 ... ) to interact or communicate in real time. As shown in FIG. 1, the live streaming system 1 includes a server 10, a user terminal 20 and user terminals 30 (30a, 30b ... ). In some embodiments, the streamers and viewers may be collectively referred to as users. The server 10 may include one or a plurality of information processing devices connected to a network NW. The user terminal 20 and 30 may be, for example, mobile terminal devices such as smartphones, tablets, laptop PCs, recorders, portable gaming devices, and wearable devices, or may be stationary devices such as desktop PCs. The server 10, the user terminal 20 and the user terminal 30 are interconnected so as to be able to communicate with each other over the various wired or wireless networks NW.

The live streaming system 1 involves the distributor LV, the viewers AU, and an administrator (or an APP provider, not shown) who manages the server 10. The distributor LV is a person who broadcasts contents in real time by recording the contents with his/her user terminal 20 and uploading them directly or indirectly to the server 10. Examples of the contents may include the distributor's own songs, talks, performances, gameplays, and any other contents. The administrator provides a platform for live-streaming contents on the server 10, and also mediates or manages real-time interactions between the distributor LV and the viewers AU. The viewer AU accesses the platform at his/her user terminal 30 to select and view a desired content. During live-streaming of the selected content, the viewer AU performs operations to comment, cheer, or send gifts via the user terminal 30. The distributor LV who is delivering the content may respond to such comments, cheers, or gifts. The response is transmitted to the viewer AU via video and/or audio, thereby establishing an interactive communication.

The term "live-streaming" may mean a mode of data transmission that allows a content recorded at the user terminal 20 of the distributor LV to be played or viewed at the user terminals 30 of the viewers AU substantially in real time, or it may mean a live broadcast realized by such a mode of transmission. The live-streaming may be achieved using existing live delivery technologies such as HTTP Live Streaming. Common Media Application Format, Web Real-Time Communications, Real-Time Messaging Protocol and MPEG DASH. Live-streaming includes a transmission mode in which the viewers AU can view a content with a specified delay simultaneously with the recording of the content by the distributor LV. As for the length of the delay, it may be acceptable for a delay with which interaction between the distributor LV and the viewers AU can be established. Note that the live-streaming is distinguished from so-called on-demand type transmission, in which the entire recorded data of the content is once stored on the server, and the server provides the data to a user at any subsequent time upon request from the user.

The term "video data" herein refers to data that includes image data (also referred to as moving image data) generated using an image capturing function of the user terminals 20 or 30, and audio data generated using an audio input function of the user terminals 20 or 30. Video data is reproduced in the user terminals 20 and 30, so that the users can view contents. In some embodiments, it is assumed that between video data generation at the distributor's user terminal and video data reproduction at the viewer's user terminal, processing is performed onto the video data to change its format, size, or specifications of the data, such as compression, decompression, encoding, decoding, or transcoding. However, the content (e.g., video images and audios) represented by the video data before and after such processing does not substantially change, so that the video data after such processing is herein described as the same as the video data before such processing. In other words, when video data is generated at the distributor's user terminal and then played back at the viewer's user terminal via the server 10, the video data generated at the distributor's user terminal, the video data that passes through the server 10, and the video data received and reproduced at the viewer's user terminal are all the same video data.

In the example in FIG. 1, the distributor LV provides the live streaming data. The user terminal 20 of the distributor LV generates the streaming data by recording images and sounds of the distributor LV, and the generated data is transmitted to the server 10 over the network NW. At the same time, the user terminal 20 displays a recorded video image VD of the distributor LV on the display of the user terminal 20 to allow the distributor LV to check the live streaming contents currently performed.

The user terminals 30a and 30b of the viewers AU1 and AU2 respectively, who have requested the platform to view the live streaming of the distributor LV, receive video data related to the live streaming (may also be herein referred to as "live-streaming video data") over the network NW and reproduce the received video data to display video images VD1 and VD2 on the displays and output audio through the speakers. The video images VD1 and VD2 displayed at the user terminals 30a and 30b, respectively, are substantially the same as the video image VD captured by the user terminal 20 of the distributor LV, and the audio outputted at the user terminals 30a and 30b is substantially the same as the audio recorded by the user terminal 20 of the distributor LV.

Recording of the images and sounds at the user terminal 20 of the distributor LV and reproduction of the video data at the user terminals 30a and 30b of the viewers AU1 and AU2 are performed substantially simultaneously. Once the viewer AU1 types a comment about the contents provided by the distributor LV on the user terminal 30a, the server 10 displays the comment on the user terminal 20 of the distributor LV in real time and also displays the comment on the user terminals 30a and 30b of the viewers AU1 and AU2, respectively. When the distributor LV reads the comment and develops his/her talk to cover and respond to the comment, the video and sound of the talk are displayed on the user terminals 30a and 30b of the viewers AU1 and AU2, respectively. This interactive action is recognized as the establishment of a conversation between the distributor LV and the viewer AU1. In this way, the live streaming system 1 realizes the live streaming that enables interactive communication, not one-way communication.

Figure 2:
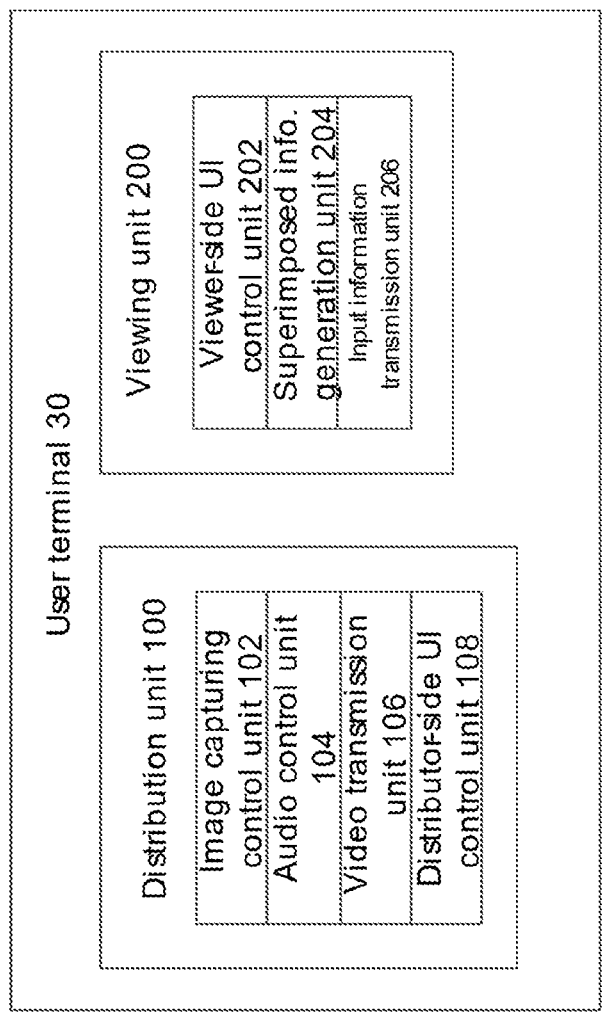
FIG. 2 is a block diagram showing functions and configuration of the user terminal 30 of FIG. 1 according to some embodiments of the present disclosure.

FIG. 2 is a block diagram showing functions and configuration of the user terminal 30 of FIG. 1 according to some embodiments of the present disclosure. The user terminal 20 has the same or similar functions and configuration as the user terminal 30. Each block in FIG. 2 and the subsequent block diagrams may be realized by elements such as a computer CPU or a mechanical device in terms of hardware, and can be realized by a computer program or the like in terms of software. Functional blocks could be realized by cooperative operation between these elements. Therefore, it is understood by those skilled in the art that these functional blocks can be realized in various forms by combining hardware and software.

The distributor LV and the viewers AU may download and install a live streaming application program (hereinafter referred to as a live streaming application) to the user terminals 20 and 30 from a download site over the network NW. Alternatively, the live streaming application may be pre-installed on the user terminals 20 and 30. When the live streaming application is executed on the user terminals 20 and 30, the user terminals 20 and 30 communicate with the server 10 over the network NW to implement or execute various functions. Hereinafter, the functions implemented by the user terminals 20 and 30 (processors such as CPUs) in which the live streaming application is run will be described as functions of the user terminals 20 and 30. These functions are realized in practice by the live streaming application on the user terminals 20 and 30. In some embodiments, these functions may be realized by a computer program that is written in a programming language such as HTML (HyperText Markup Language), transmitted from the server 10 to web browsers of the user terminals 20 and 30 over the network NW, and executed by the web browsers.

The user terminal 30 includes a distribution unit 100 and a viewing unit 200. The distribution unit 100 generates video data in which the user's (or the user side's) image and sound are recorded, and provides the video data to the server 10. The viewing unit 200 receives video data from the server 10 to reproduce the video data. The user activates the distribution unit 100 when the user performs live streaming, and activates the viewing unit 200 when the user views a video. The user terminal in which the distribution unit 100 is activated is the distributor's terminal, i.e., the user terminal that generates the video data. The user terminal in which the viewing unit 200 is activated is the viewer's terminal, i.e., the user terminal in which the video data is reproduced and played.

The distribution unit 100 includes an image capturing control unit 102, an audio control unit 104, a video transmission unit 106, and a distribution-side UI control unit 108. The image capturing control unit 102 is connected to a camera (not shown in FIG. 2) and controls image capturing performed by the camera. The image capturing control unit 102 obtains image data from the camera. The audio control unit 104 is connected to a microphone (not shown in FIG. 2) and controls audio input from the microphone. The audio control unit 104 obtains audio data through the microphone. The video transmission unit 106 transmits video data including the image data obtained by the image capturing control unit 102 and the audio data obtained by the audio control unit 104 to the server 10 over the network NW. The video data is transmitted by the video transmission unit 106 in real time. That is, the generation of the video data by the image capturing control unit 102 and the audio control unit 104, and the transmission of the generated video data by the video transmission unit 106 are performed substantially at the same time. The distribution-side UI control unit 108 controls an UI (user interface) for the distributor. The distribution-side UI control unit 108 may be connected to a display (not shown in FIG. 2), and displays a video on the display by reproducing the video data that is to be transmitted by the video transmission unit 106. The distribution-side UI control unit 108 may display an operation object or an instruction-accepting object on the display, and accepts inputs from the distributor who taps on the object.

The viewing unit 200 includes a viewer-side UI control unit 202, a superimposed information generation unit 204, and an input information transmission unit 206. The viewing unit 200 receives, from the server 10 over the network NW, video data related to the live streaming in which the distributor, the viewer who is the user of the user terminal 30, and other viewers participate. The viewer-side UI control unit 202 controls the UI for the viewers. The viewer-side UI control unit 202 is connected to a display and a speaker (not shown in FIG. 2), and reproduces the received video data to display video images on the display and output audio through the speaker. The state where the image is outputted to the display and the audio is outputted from the speaker can be referred to as "the video data is played". The viewer-side UI control unit 202 is also connected to input means (not shown in FIG. 2) such as touch panels, keyboards, and displays, and obtains user input via these input means. The superimposed information generation unit 204 superimposes a predetermined frame image on an image generated from the video data from the server 10. The frame image includes various user interface objects (hereinafter simply referred to as "objects") for accepting inputs from the user, comments entered by the viewers, and/or information obtained from the server 10. The input information transmission unit 206 transmits the user input obtained by the viewer-side UI control unit 202 to the server 10 over the network NW.

Figure 3:
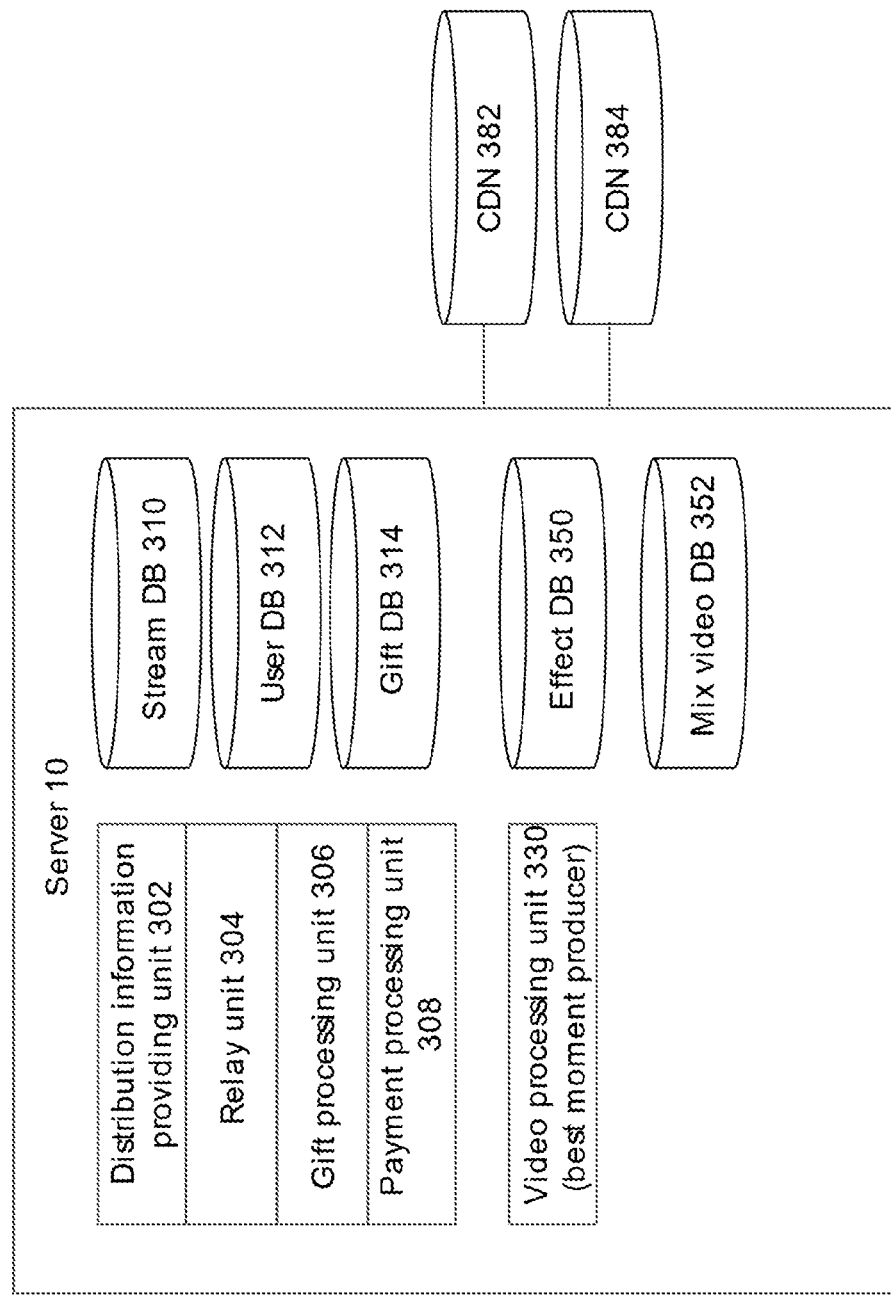
FIG. 3 shows a block diagram illustrating functions and configuration of the server of FIG. 1 according to some embodiments of the present disclosure.

FIG. 3 shows a block diagram illustrating functions and configuration of the server 10 of FIG. 1 according to some embodiments of the present disclosure. The server 10 includes a distribution information providing unit 302, a relay unit 304, a gift processing unit 306, a payment processing unit 308, a stream DB 310, a user DB 312, a gift DB 314, a video processing unit 330, an effect DB 350, and a mix video DB 352. The server 10 communicates with a CDN (Content Delivery Network) 382 and a CDN 384.

Upon reception of a notification or a request from the user terminal 20 on the distributor side to start a live streaming over the network NW, the distribution information providing unit 302 registers a stream ID for identifying this live streaming and the distributor ID of the distributor who performs the live streaming in the stream DB 310.

When the distribution information providing unit 302 receives a request to provide information about live streams from the viewing unit 200 of the user terminal 30 on the viewer side over the network NW, the distribution information providing unit 302 retrieves or checks currently available live streams from the stream DB 310 and makes a list of the available live streams. The distribution information providing unit 302 transmits the generated list to the requesting user terminal 30 over the network NW. The viewer-side UI control unit 202 of the requesting user terminal 30 generates a live stream selection screen based on the received list and displays it on the display of the user terminal 30.

Once the input information transmission unit 206 of the user terminal 30 receives the viewer's selection result on the live stream selection screen, the input information transmission unit 206 generates a distribution request including the stream ID of the selected live stream, and transmits the request to the server 10 over the network NW. The distribution information providing unit 302 starts providing, to the requesting user terminal 30, the live stream specified by the stream ID included in the received distribution request. The distribution information providing unit 302 updates the stream DB 310 to include the user ID of the viewer of the requesting user terminal 30 into the viewer IDs of (or corresponding to) the stream ID.

The relay unit 304 relays the video data from the distributor-side user terminal 20 to the viewer-side user terminal 30 in the live streaming started by the distribution information providing unit 302. The relay unit 304 receives from the input information transmission unit 206 a signal that represents user input by a viewer during the live streaming or reproduction of the video data. The signal that represents user input may be an object specifying signal for specifying an object displayed on the display of the user terminal 30. The object specifying signal may include the viewer ID of the viewer, the distributor ID of the distributor of the live stream that the viewer watches, and an object ID that identifies the object. When the object is a gift, the object ID is the gift ID. Similarly, the relay unit 304 receives, from the distribution unit 100 of the user terminal 20, a signal that represents user input performed by the distributor during reproduction of the video data (or during the live streaming). The signal could be an object specifying signal.

Alternatively, the signal that represents user input may be a comment input signal including a comment entered by a viewer into the user terminal 30 and the viewer ID of the viewer. Upon reception of the comment input signal, the relay unit 304 transmits the comment and the viewer ID included in the signal to the user terminal 20 of the distributor and the user terminals 30 of other viewers. In these user terminals 20 and 30, the viewer-side UI control unit 202 and the superimposed information generation unit 204 display the received comment on the display in association with the viewer ID also received.

The gift processing unit 306 updates the user DB 312 so as to increase the points of the distributor depending on the points of the gift identified by the gift ID included in the object specifying signal. Specifically, the gift processing unit 306 refers to the gift DB 314 to specify the points to be granted for the gift ID included in the received object specifying signal. The gift processing unit 306 then updates the user DB 312 to add the determined points to the points of (or corresponding to) the distributor ID included in the object specifying signal.

The payment processing unit 308 processes payment of a price of a gift from a viewer in response to reception of the object specifying signal. Specifically, the payment processing unit 308 refers to the gift DB 314 to specify the price points of the gift identified by the gift ID included in the object specifying signal. The payment processing unit 308 then updates the user DB 312 to subtract the specified price points from the points of the viewer identified by the viewer ID included in the object specifying signal.

The CDN 382 and the CDN 384 are configured to store video data. In some embodiments, the CDN 382 is configured to store stream data (or video data) from distributors. For example, the distribution information providing unit 302 (or the relay unit 304, in some embodiments) may provide a live stream to the requesting user terminal 30 by providing an address specifying a space in the CDN 382 wherein the stream data of the live stream is stored (or uploaded).

In some embodiments, the CDN 384 is configured to store video data generated by the video processing unit 330. The details will be described later. The distribution information providing unit 302 (or the relay unit 304, in some embodiments) may provide a video to a user terminal 30 by providing an address specifying a space in the CDN 384 wherein the video data is stored. The CDN 382 and/or the CDN 384 may be or may include a server or a database.

FIG. 4 is a data structure diagram of an example of the stream DB 310 of FIG. 3. The stream DB 310 holds information regarding a live stream currently taking place. The stream DB 310 stores the stream ID, the distributor ID, the viewer ID and the address, in association with each other. The stream ID is for identifying a live stream on a live streaming platform provided by the live streaming system 1. The distributor ID is a user ID for identifying the distributor who provides the live stream. The viewer ID is a user ID for identifying a viewer of the live stream. In the live streaming platform provided by the live streaming system 1 of some embodiments, when a user starts a live stream, the user becomes a distributor, and when the same user views a live stream broadcast by another user, the user also becomes a viewer. Therefore, the distinction between a distributor and a viewer is not fixed, and a user ID registered as a distributor ID at one time may be registered as a viewer ID at another time. The address specifies the space wherein the corresponding stream is stored. The space may reside in a server or a CDN outside the server 10. In some embodiments, the address could be an URL address.

FIG. 5 is a data structure diagram showing an example of the user DB 312 of FIG. 3. The user DB 312 holds information regarding users. The user DB 312 stores the user ID and the point, in association with each other. The user ID identifies a user. The point corresponds to the points the corresponding user holds. The point is the electronic value circulated within the live streaming platform. In some embodiments, when a distributor receives a gift from a viewer during a live stream, the distributor's points increase by the value corresponding to the gift. The points are used, for example, to determine the amount of reward (such as money) the distributor receives from the administrator of the live streaming platform. In some embodiments, when the distributor receives a gift from a viewer, the distributor may be given the amount of money corresponding to the gift instead of the points.

FIG. 6 is a data structure diagram showing an example of the gift DB 314 of FIG. 3. The gift DB 314 holds information regarding gifts available for the viewers in the live streaming. A gift is electronic data. A gift may be purchased with the points or money, or can be given for free. A gift may be given by a viewer to a distributor. Giving a gift to a distributor is also referred to as using, sending, or throwing the gift. Some gifts may be purchased and used at the same time, and some gifts may be purchased and then used at any time later by the purchaser viewer. When a viewer gives a gift to a distributor, the distributor is awarded the amount of points corresponding to the gift. When a gift is used, the use may trigger an effect associated with the gift. For example, an effect (such as visual or sound effect) corresponding to the gift will appear on the live streaming screen.

The gift DB 314 stores the gift ID, the awarded points, the price points, the best moment tag, and the effect link, in association with each other. The gift ID is for identifying a gift. The awarded points are the amount of points awarded to a distributor when the gift is given to the distributor. The price points are the amount of points to be paid for use (or purchase) of the gift. A viewer is able to give a desired gift to a distributor by paying the price points of the desired gift when the viewer is viewing the live stream. The payment of the price points may be made by an appropriate electronic payment means. For example, the payment may be made by the viewer paying the price points to the administrator. Alternatively, bank transfers or credit card payments may be used. The administrator is able to desirably set the relationship between the awarded points and the price points. For example, it may be set as the awarded points=the price points. Alternatively, points obtained by multiplying the awarded points by a predetermined coefficient such as 1.2 may be set as the price points, or points obtained by adding predetermined fee points to the awarded points may be set as the price points.

The best moment tag indicates if a gift belongs to the best moment type. In some embodiments, when a "best moment" gift is sent by a viewer to a distributor, the video processing unit 330 identifies the best moment tag of the gift and produces a video including the video of the distributor and the effect corresponding to the gift. The details will be described later.

The effect link stores the link (or address) of the effect (such as visual or sound effect) corresponding to a gift. The effect data linked by the effect links are stored in the effect DB 350. In some embodiments, the effect DB 350 could be implemented outside the server 10.

The video processing unit 330 is configured to generate a video (or video data) including video of a distributor (or the distributor video) and an effect of a gift sent to the distributor from a viewer. The distributor video could be (or could be from) the live stream video of the distributor. For example, when the server 10 receives a gifting signal (a request to send a gift) from the viewer to the distributor, the video processing unit 330 refers to the CDN 382 to obtain (or extract, or clip, or copy) the distributor video. The video processing unit 330 may obtain the distributor video from or at a timing right after (or substantially at the same time with) receiving the gifting signal. The video processing unit 330 may obtain the distributor video from or at a timing that is later than receiving the gifting signal for a predetermined time length, such as several seconds.

After obtaining the distributor video, the video processing unit 330 generates a mix video by overlapping the effect (or gift effect) corresponding to the gifting signal onto the obtained distributor video. For example, the video processing unit 330 may refer to the gift DB 314 for the effect link by a gift ID included in the gifting signal, and then refer to the effect DB 350 to obtain the effect data (which may be a video data). The video processing unit 330 may overlap the gift effect onto the distributor video at a timing that is later than the timing from which the distributor video is obtained, such as, several seconds later (5 seconds later, for example).

In some embodiments, generating the mix video includes preventing the gift effect from overlapping a predetermined portion of the distributor. For example, the face portion of the distributor in the distributor video (or frames of the distributor video) could be detected or identified by the video processing unit 330 (or another image identification unit within the server 10). The video processing unit 330 then avoids covering the distributor's face when overlapping the gift effect onto the distributor video. For example, the video processing unit 330 may move the gift effect's position or adjust the gift effect's shape according to the distributor's face position such that the distributor's face can always be visible in the mix video. In some embodiments, the video processing unit 330 may include a FFmpeg library for video processing.

In some embodiments, in overlapping the gift effect onto the distributor video, the video processing unit 330 (or another image/video identification unit within the server 10) determines or detects a portion of the gift effect to overlap or cover a predetermined portion of the distributor, and increases transparency of the portion of the gift effect. For example, when the video processing unit 330 detects a portion of the gift effect covering the distributor's face, the video processing unit 330 may make the portion of the gift effect half transparent, such that the distributor's face can still be visible in the mix video.

The video processing unit 330 may store the generated mix video in a space (or an address) different from the space (or the address) from which the distributor video is obtained. For example, the mix video may be stored in a space or an address within the CDN 384. Therefore, the generation of the mix video does not impact or interfere with the storage or uploading of the video data of the distributor into the space in the CDN 382.

After the generation and storage of the mix video, the server 10 (or the distribution information providing unit 302, for example) may inform the viewer (the viewer who sent the gift, for example) and/or the distributor about the space (or the address) storing the mix video. Therefore, the viewer or the distributor can access the mix video and display on their respective user terminals.

FIG. 14 is a data structure diagram showing an example of the mix video DB 352 of FIG. 3. The mix video DB 352 holds information regarding mix videos. The mix video DB 352 stores the mix video ID, the distributor ID, the gifting viewer ID, the shared user ID, the mix video file link, and the expiration date, in association with each other.

The mix video ID is for identifying a mix video. The distributor ID is the user ID of the distributor who receives the gift (or best moment gift) corresponding to the mix video. The gifting viewer ID is the user ID of the viewer who sends the gift (or best moment gift) corresponding to the mix video. The shared user ID holds the user ID(s) of the users (such as viewers) who are shared with the mix video. For example, the shared user ID may holds the user IDs of the followers of the distributor who receives the gift corresponding to the mix video. The mix video file link holds the link directed to the space wherein the mix video is stored, such as a space in the CDN 384. In some embodiments, there could be an expiration date for each mix video. The expiration date may indicate the date when the mix video expires on the CDN 384 or on a database in association with the distributor.

Figure 7:
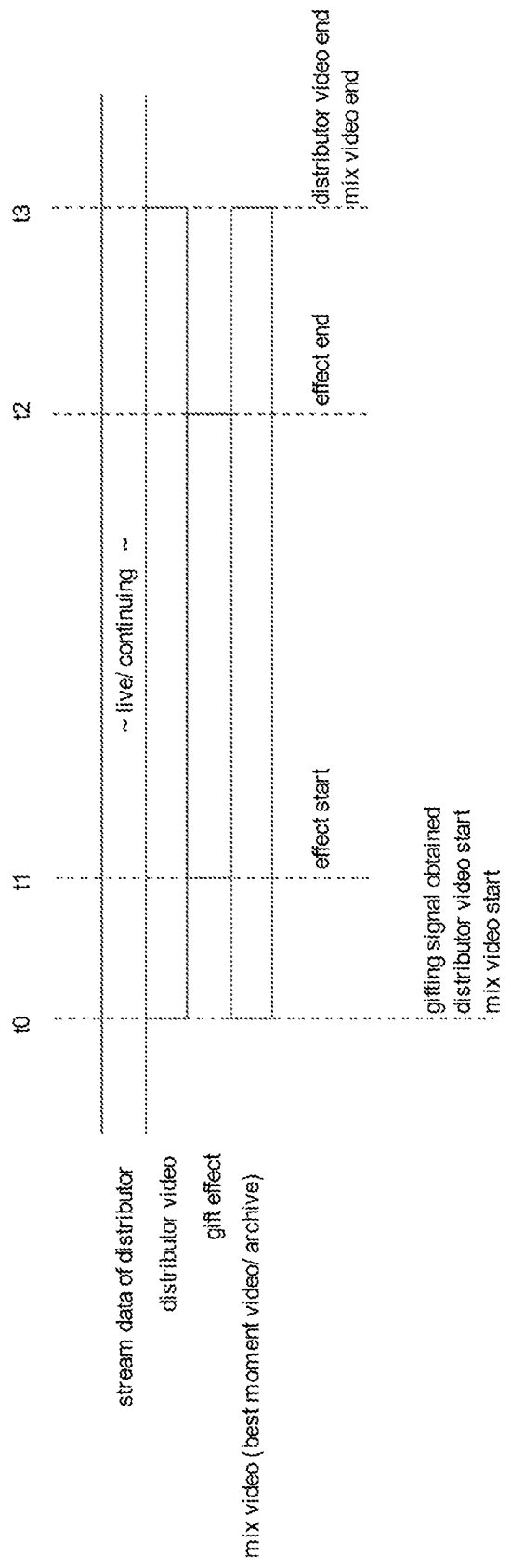
FIG. 7 shows an example of the generation of the mix video according to some embodiments of the present disclosure.

FIG. 7 shows an example of the generation of the mix video according to some embodiments of the present disclosure.

The stream data (or live stream data) of the distributor is continuing throughout timings t0, t1, t2 and t3.

At timing t0, the gifting signal to send a gift to the distributor is obtained from a viewer. The video processing unit 330 refers to the CDN 382 to obtain (or extract, or clip, or copy) the distributor video. The video processing unit 330 starts generating the mix video. During the time t0~t1, the mix video includes the same content as that of the distributor video.

At timing t1, the video processing unit 330 starts overlapping (or inserting) the gift effect obtained from the effect DB 350 onto the distributor video to generate the mix video.

At timing t2, the gift effect ends. The time length of the gift effect is t2−t1. During the time t1~t2, the mix video includes the distributor video and the gift effect.

At timing t3, the distributor video ends. The mix video ends. During the time t2−t3, the mix video includes the same content as that of the distributor video.

In some embodiments, the distributor video and the mix video have the same time length. In some embodiments, the distributor video includes the content of the stream data of the distributor during t0~t3. In some embodiments, timing t1 is several seconds later than timing t0, for example, 5 seconds later. In some embodiments, timing t3 could be equal to timing t2, which means the mix video ends at the same time when the gift effect ends. In some embodiments, the mix video can be referred to as a best moment video or a best moment archive video. In some embodiments, the video processing unit 330 can be referred to as a best moment producer.

Figure 8:
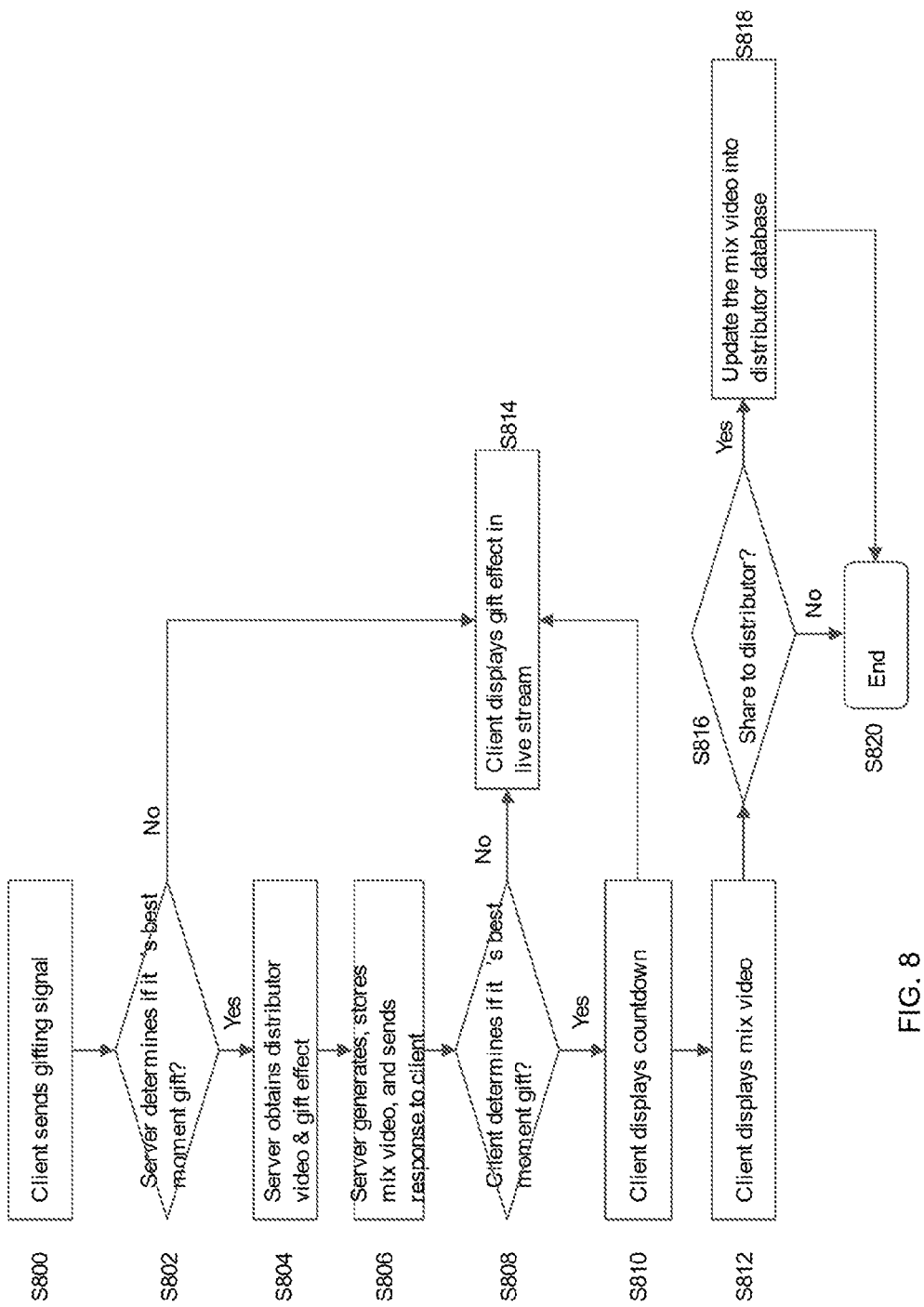
FIG. 8 shows an exemplary flow chart illustrating a method according to some embodiments of the present disclosure.

FIG. 8 shows an exemplary flow chart illustrating a method according to some embodiments of the present disclosure.

At step S800, a client sends a gifting signal to the server 10. The client could be a user terminal of a viewer. The gifting signal indicates a gift sent from the viewer to a distributor. The gifting signal could be sent while the viewer is watching a live stream of the distributor.

At step S802, the server 10 determines if the gift (or gift ID) included in the gifting signal corresponds to a best moment gift (that is, with its best moment tag marked as "Yes"). If Yes, the flow goes to step S804. If No, the flow goes to step S814. The determination process could be performed by the distribution information providing unit 302 or the gift processing unit 306, for example.

At step S804, the server 10 (or the video processing unit 330) obtains the distributor video and the gift effect. The distributor video may be obtained from the CDN 382. The gift effect may be obtained from the effect DB 350.

At step S806, the server 10 (or the video processing unit 330) generates the mix video or the best moment video, which includes the distributor video and the gift effect. The server 10 stores the mix video into the CDN 384. The server 10 then transmits a response signal to the client. The response signal may include the gift ID of the best moment gift and an address of the space in the CDN 384 wherein the mix video is stored. In some embodiments, the response signal could be sent to a notification service, such as the Pub/Sub (Publish/Subscribe) service, which then transmits to the client.

At step S808, the client determines if the gift ID included in the response signal corresponds to a best moment gift. If Yes, the flow goes to step S810. If No, the flow goes to step S814. In some embodiments, the client could include a handling unit (such as a Pub/Sub handler) that handles the signals from the notification service.

At step S810, the client displays a countdown message (for example, on a display of the user terminal of the viewer) in response to receiving the response signal including a gift ID corresponding to a best moment gift. In some embodiments, by including the best moment gift information in the response signal, the server 10 enables the client to display the countdown message that indicates upcoming of the gift effect.

At step S814, the client displays the gift effect in the live stream of the distributor. The gift effect may be overlapped onto the live stream video of the distributor. In some embodiments, the gift effect is displayed on a predetermined or fixed position of the display of the user terminal. The gift effect may overlap or cover the distributor's face such that the viewer cannot see clearly the reaction of the distributor.

At step S812, the client displays the mix video. Specifically, the client accesses the mix video in the CDN 384 with the address included in the response signal. The mix video may be displayed in the live stream of the distributor. In some embodiments, the mix video may be displayed separately from the live stream of the distributor. For example, the mix video may be displayed after the live stream of the distributor.

At step S816, the client enables the viewer to choose whether or not to share the mix video to the distributor. For example, the client may display a selection object for the viewer to make the selection. If the selection is Yes, the flow goes to step S818. If the selection is No, the flow goes to step S820.

At step S818, the client updates or stores the mix video into a distributor database. The client may send a request signal to the server 10, and the server 10 stores the mix video into the distributor database accordingly. The distributor database is a database which is associated with the distributor and can be accessed by the distributor. For example, the distributor database stores data for a clip page, a post page, or a private message page of the distributor. The distributor can visit the clip page, the post page or the private message page to see the clip (for example, video clip), the post or the private message that includes or links to the mix video.

At step S820, the flow ends.

In some embodiments, the countdown mechanism may enable the viewer to be more prepared to receive the reaction of the distributor when the gift effect is shown. In some embodiments, the mix video enables the viewer to clearly receive the reaction of the distributor because the distributor's face is not covered or overlapped by the gift effect in the mix video. In some embodiments, the share mechanism can improve the interaction between the viewer and the distributor. For example, the share mechanism can help the distributor to save or to archive the best moment video in the clip page, the post page or the private message page. In some embodiments, the share mechanism can trigger an automatic generation of a thank-you post in the post page of the distributor. The thank-you post expresses the distributor's gratitude towards the gifting viewer's gift, and can be seen by the gifting viewer and other viewers. The thank-you post may improve the distributor's reputation and may encourage other viewers to further interact with the distributor. The post generation could be performed by a post generation unit within the server 10, for example.

In some embodiments, some steps may be skipped or interchanged. For example, after the viewer selects a best moment gift to send, the user terminal may detect that it is a best moment gift and start the countdown message. For example, step S800 may go directly to step S808 (or step S810), in parallel with steps S802, S804 and S806.

Figure 15:
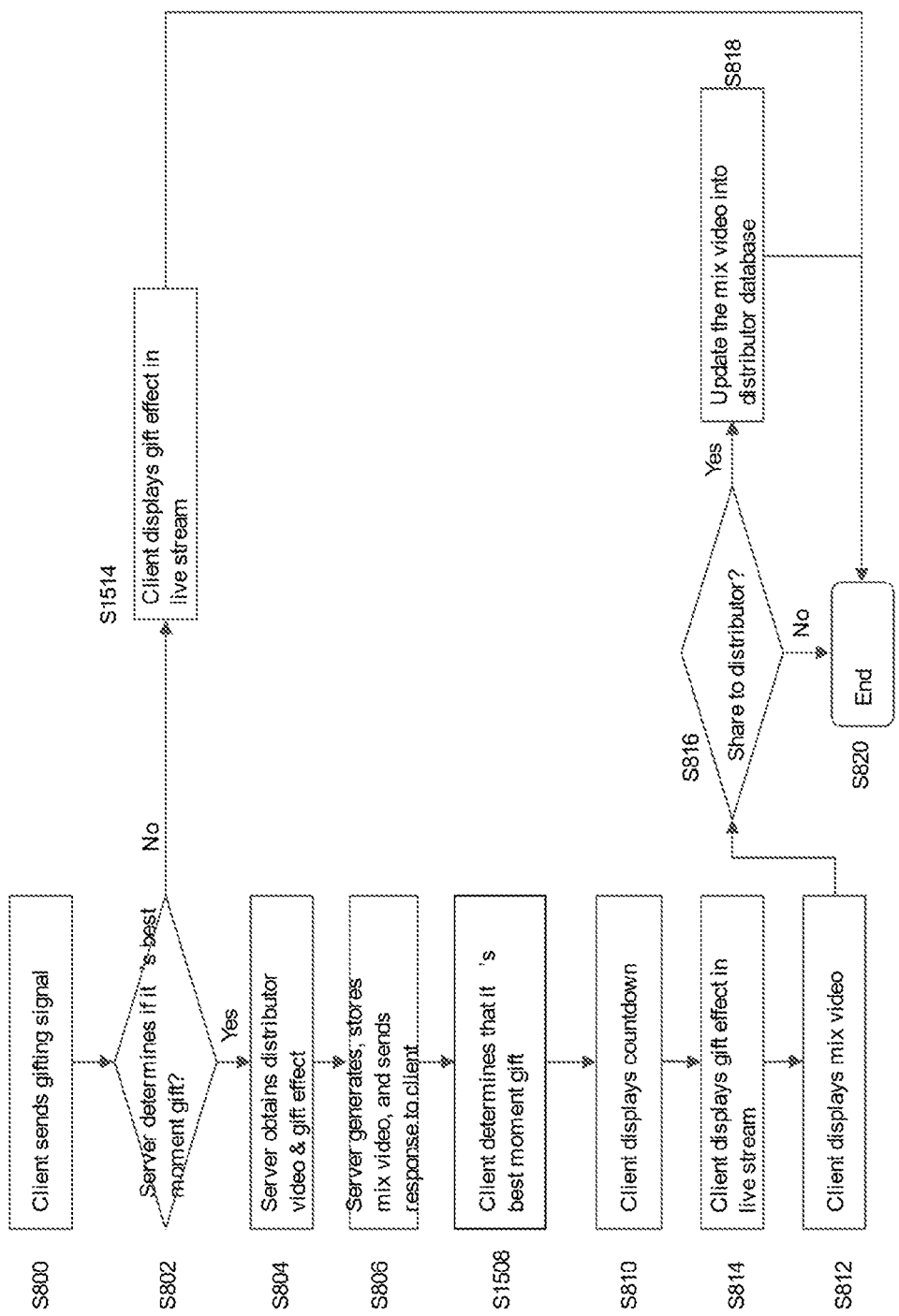
FIG. 15 shows an exemplary flow chart illustrating a method according to some embodiments of the present disclosure.

FIG. 15 shows an exemplary flow chart illustrating a method according to some embodiments of the present disclosure.

Different from the flow in FIG. 8, at step S1508, the client determines that it is best moment gift (which was initiated by the client itself in step S800, and therefore there is non need for judging whether the gifting signal is about a best moment gift again by the client) and the flow goes to step S810 wherein the countdown message is displayed. At step S802, if the server determines that the gifting signal is not related to a best moment gift, the flow goes to step S1514 and step S820. That is, the client displays the gift effect in the live stream and then the flow ends.

Figure 9:
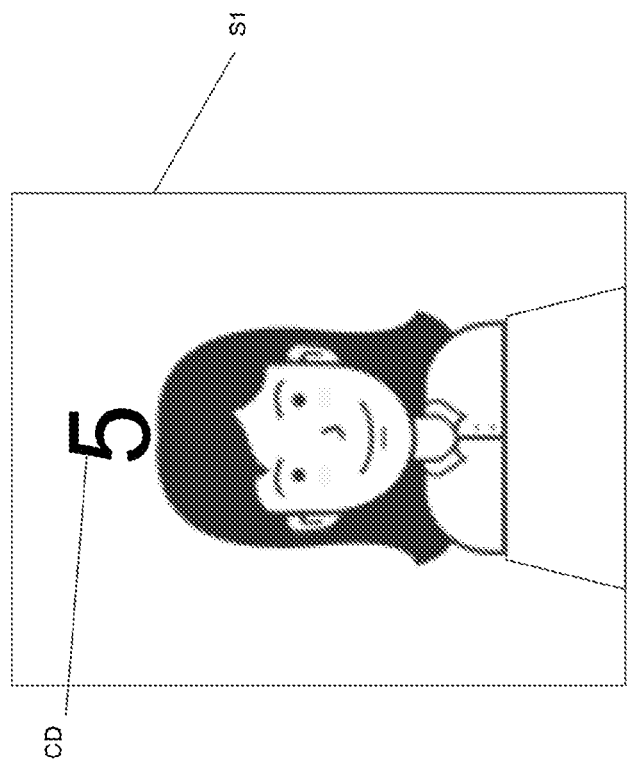
FIG. 9 shows an example of the countdown message according to some embodiments of the present disclosure.

FIG. 9 shows an example of the countdown message according to some embodiments of the present disclosure. FIG. 9 may represent an example of the step S810 in FIG. 8. S1 is the screen of the user terminal of the viewer or the distributor. The countdown message CD may count down from 5 to 0. In some embodiments, the countdown message may start at or right after timing t0 in FIG. 7. The countdown may last from timing t0 to timing t1. When the countdown is finished, the gift effect starts.

In some embodiments, the countdown message is shown to the distributor (who receives the best moment gift) and other viewers in the live stream of the distributor, so that the distributor and/or other viewers can be prepared to react to the best moment gift. The countdown message could be shown to the distributor, the gifting viewer, and other viewers in a synchronized manner. The synchronization may be performed by the distribution information providing unit 302 of server 10 or another synchronization unit within the server 10. In some embodiments, the distribution information providing unit 302 may transfer a notification request regarding the countdown message to a notification service, such as the Pub/Sub service. The notification service then manages the synchronization process when notifying the distributor's user terminal, the gifting viewer's user terminal, and other viewers' user terminals to display the countdown message. In some embodiments, a synchronized state means that the time difference between displaying the countdown message on the distributor's user terminal, the gifting viewer's user terminal, and other viewers' user terminals is less than 1, 3, or 5 seconds.

In some embodiments, the mix video mechanism/feature guarantees that the distributor, the gifting viewer and/or other viewers can revisit and/or get the clear reaction of the distributor during the gift sending, even if there is time difference between displaying the gift effect or the countdown message in each other's user terminal.

Figure 10:
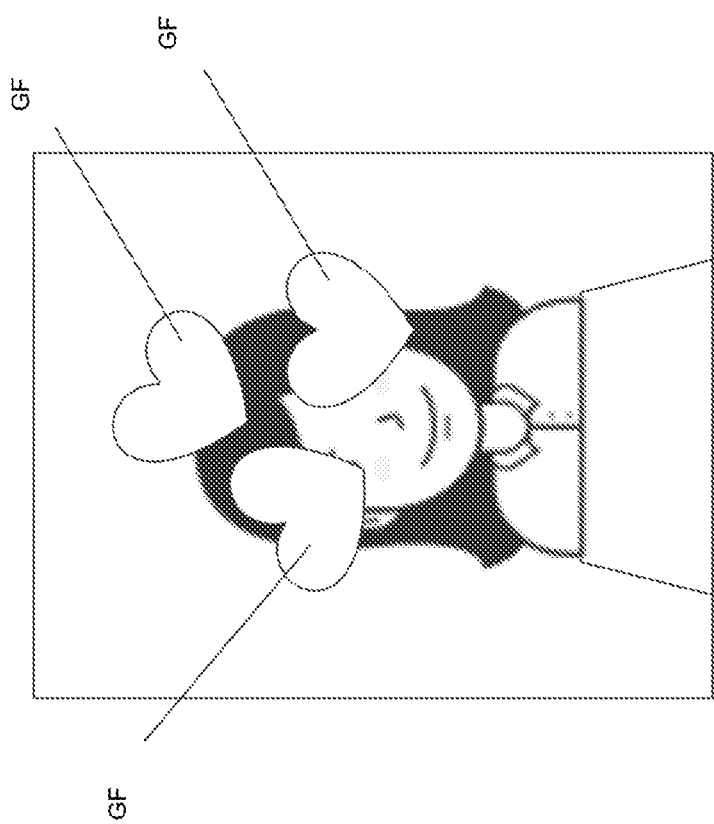
FIG. 10 shows an example of the gift effect according to some embodiments of the present disclosure.

FIG. 10 shows an example of the gift effect according to some embodiments of the present disclosure. FIG. 10 may represent an example of the step S814 in FIG. 8. As shown in FIG. 10, the gift effect GF displayed during the live stream of the distributor may cover or overlap the distributor's face. The viewer may have difficulty understanding the reaction of the distributor when the gift effect is displayed.

Figure 11:
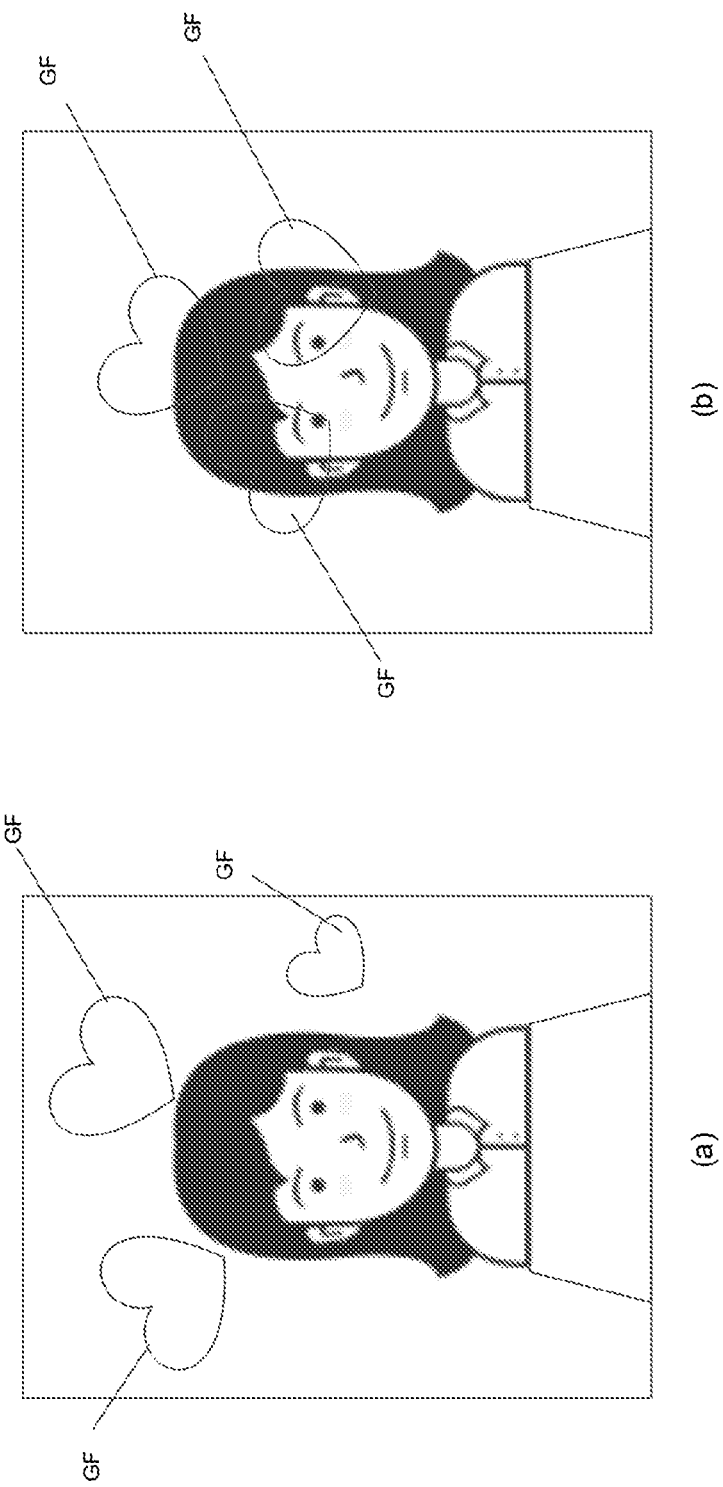
FIG. 11(a) and FIG. 11(b) show examples of the mix video according to some embodiments of the present disclosure.

FIG. 11(*a*) and FIG. 11(*b*) show examples of the mix video according to some embodiments of the present disclosure. As shown in FIG. 1*l* (a), the gift effect GF is moved to prevent covering the distributor's face. A portion of the gift effect may be shrinked, rotated, or deformed. As shown in FIG. 11(*b*), the portion of the gift effect GF that overlaps the distributor's face is turned into transparent to prevent covering the distributor's face. The above processes may be performed by the video processing unit 330.

Figure 12:
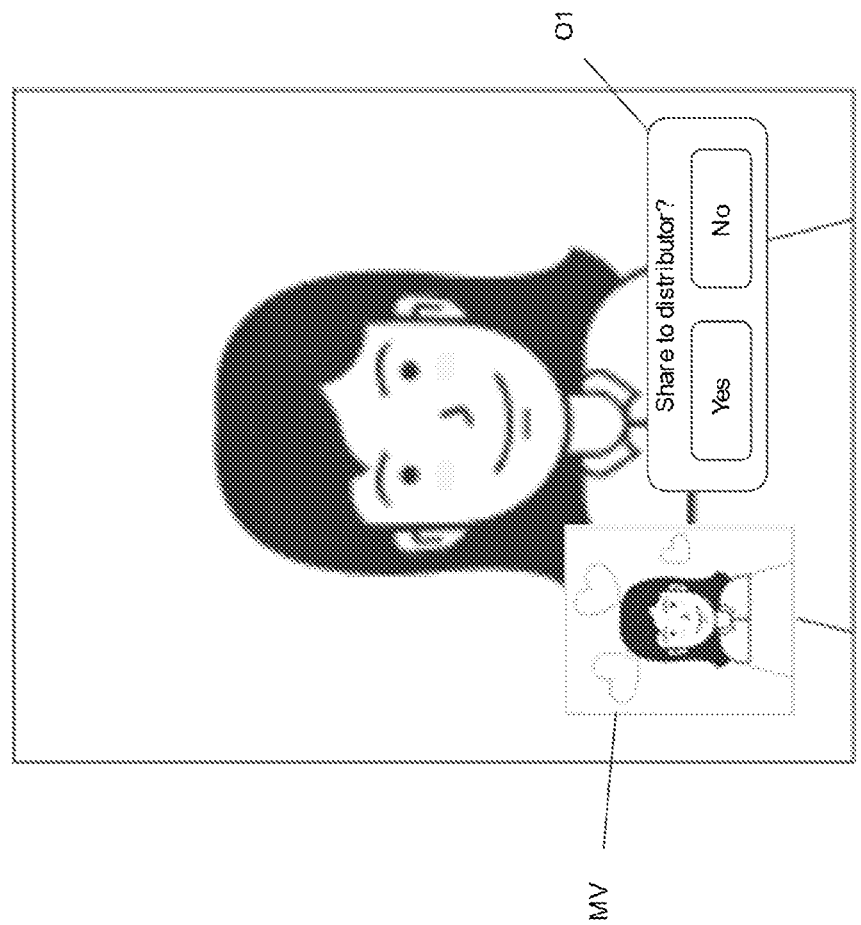
FIG. 12 shows an example of displaying the mix video according to some embodiments of the present disclosure.

FIG. 12 shows an example of displaying the mix video according to some embodiments of the present disclosure. FIG. 12 could be a screen of the user terminal of the viewer. FIG. 12 may represent an example of the steps S812 and S816 in FIG. 8. The mix video MV is shown in the live stream of the distributor. The selection object O1 enables the viewer to choose whether or not to share the mix video to the distributor. The mix video can be displayed before, at, or after the timing t3 in FIG. 7. The mix video can be displayed before, at, or after the timing t2 in FIG. 7. Note that the viewer may keep viewing the live stream of the distributor throughout the whole time t0 to t3.

Figure 16:
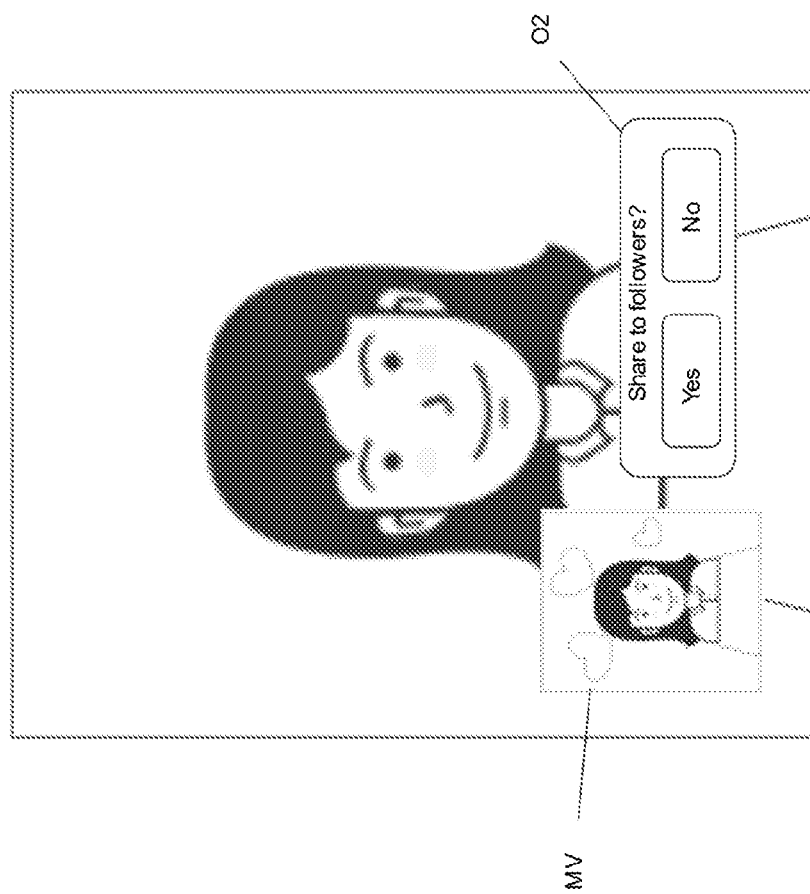
FIG. 16 shows an example of displaying the mix video according to some embodiments of the present disclosure.

FIG. 16 shows an example of displaying the mix video according to some embodiments of the present disclosure. FIG. 16 could be a screen of the user terminal of the distributor. The mix video MV is shown in the live stream of the distributor. The selection object O2 enables the distributor to choose whether or not to share the mix video to his or her followers (or other viewers, in some embodiments). The mix video can be displayed before, at, or after the timing t3 in FIG. 7. The mix video can be displayed before, at, or after the timing t2 in FIG. 7. In some embodiments, the sharing may initiate a notification (regarding the mix video) sent to the followers. That may encourage the followers to join the live stream or to send similar gifts.

Figure 17:
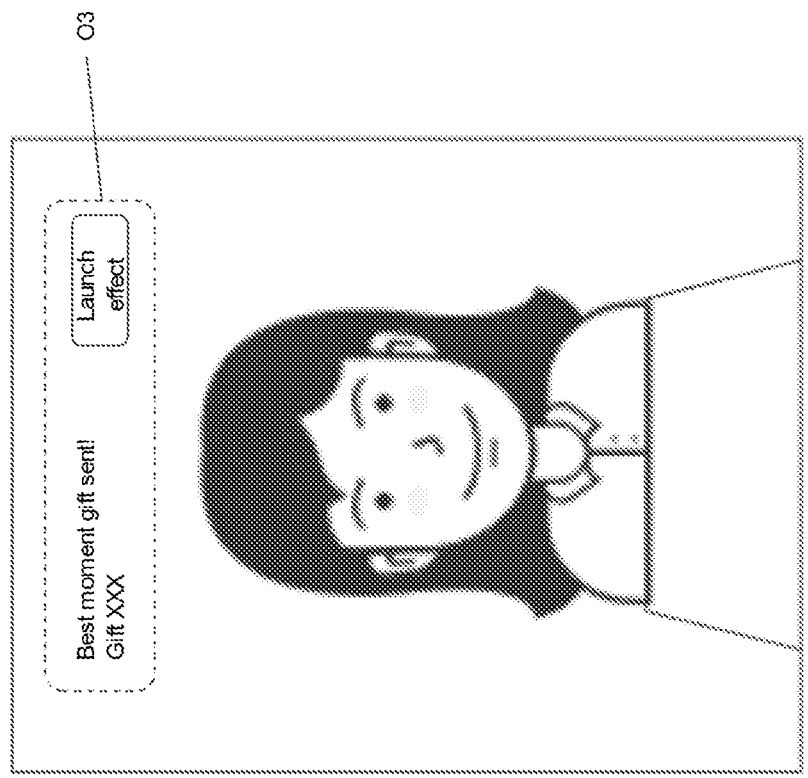
FIG. 17 shows a user interface example according to some embodiments of the present disclosure.

FIG. 17 shows a user interface example according to some embodiments of the present disclosure. FIG. 17 could be a screen of the user terminal of the gifting viewer. In this embodiment, once the best moment gift is sent, a selection object O3 is displayed for the gifting viewer to decide when to launch the gift effect (or when to display the countdown message, in some embodiments) such that the distributor, the gifting viewer and other viewers can see the gift effect. The mechanism may help prevent the gift effect to be launched in a timing when the distributor is distracted by an interaction with other viewers.

Figure 18:
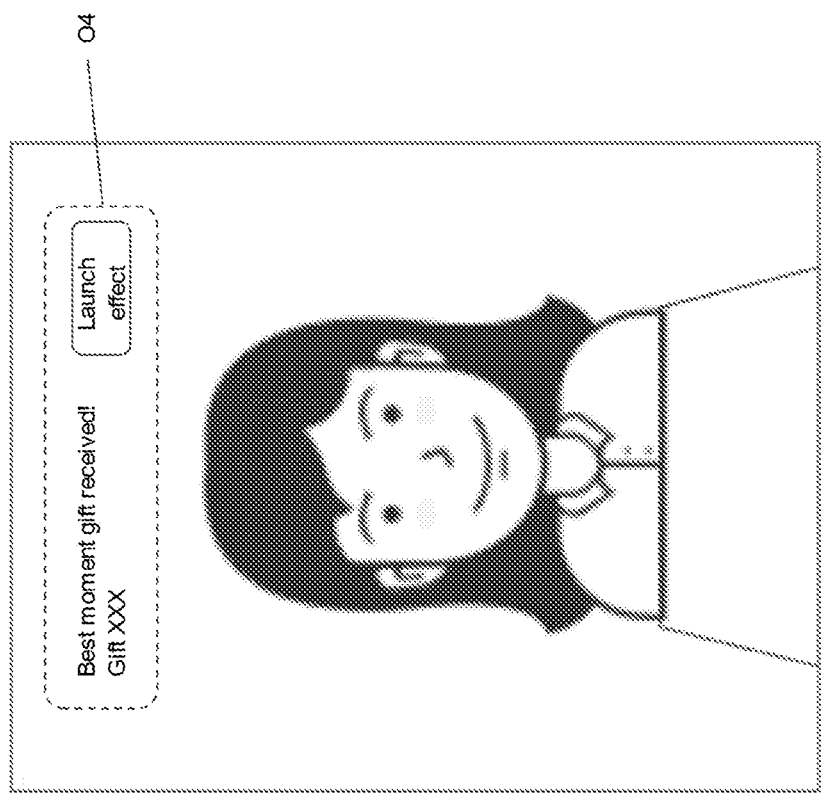
FIG. 18 shows a user interface example according to some embodiments of the present disclosure.

FIG. 18 shows a user interface example according to some embodiments of the present disclosure. FIG. 18 could be a screen of the user terminal of the distributor. In this embodiment, once the best moment gift is received, a selection object O4 is displayed for the distributor to decide when to launch the gift effect (or when to display the countdown message, in some embodiments) such that the distributor, the gifting viewer and other viewers can see the gift effect. The mechanism may help the distributor to choose the best timing of attracting viewers' attention on the best moment gifting.

Figure 13:
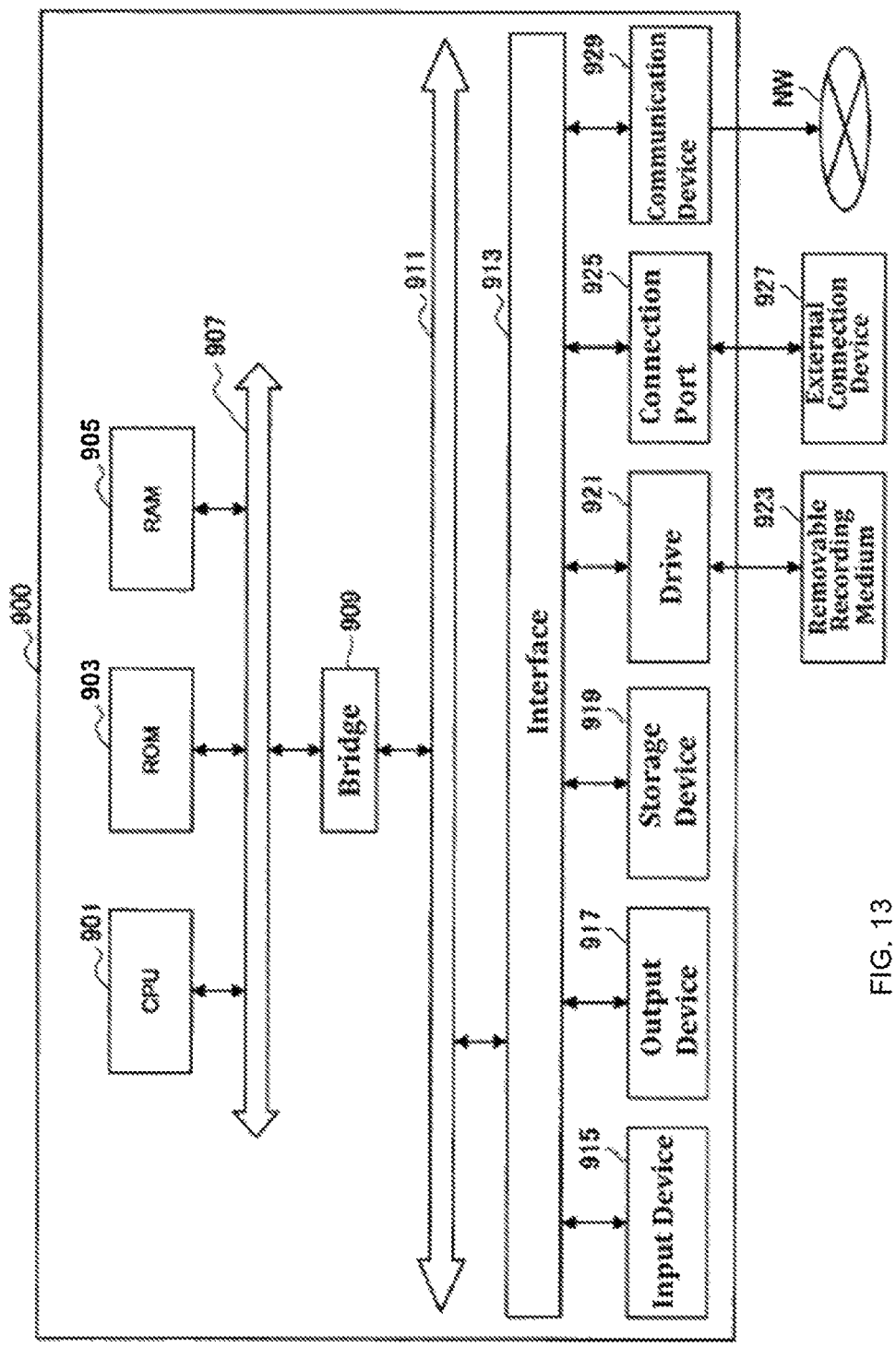
FIG. 13 is a block diagram showing an example of a hardware configuration of the information processing device according to some embodiments of the present disclosure.

Referring to FIG. 13, the hardware configuration of the information processing device will be now described. FIG. 13 is a block diagram showing an example of a hardware configuration of the information processing device according to some embodiments of the present disclosure. The illustrated information processing device 900 may, for example, realize the server 10 and/or the user terminals 20 and 30 in some embodiments.

The information processing device 900 includes a CPU 901, ROM (Read Only Memory) 903, and RAM (Random Access Memory) 905. The information processing device 900 may also include a host bus 907, a bridge 909, an external bus 911, an interface 913, an input device 915, an output device 917, a storage device 919, a drive 921, a connection port 925, and a communication device 929. In addition, the information processing device 900 includes an image capturing device such as a camera (not shown). In addition to or instead of the CPU 901, the information processing device 900 may also include a DSP (Digital Signal Processor) or ASIC (Application Specific Integrated Circuit).

The CPU 901 functions as an arithmetic processing device and a control device, and controls all or some of the operations in the information processing device 900 according to various programs stored in the ROM 903, the RAM 905, the storage device 919, or the removable recording medium 923. For example, the CPU 901 controls the overall operation of each functional unit included in the server 10 and the user terminals 20 and 30 in some embodiments. The ROM 903 stores programs, calculation parameters, and the like used by the CPU 901. The RAM 905 serves as a primary storage that stores a program used in the execution of the CPU 901, parameters that appropriately change in the execution, and the like. The CPU 901, ROM 903, and RAM 905 are interconnected to each other by a host bus 907 which may be an internal bus such as a CPU bus. Further, the host bus 907 is connected to an external bus 911 such as a PCI (Peripheral Component Interconnect/Interface) bus via a bridge 909.

The input device 915 may be a user-operated device such as a mouse, keyboard, touch panel, buttons, switches and levers, or a device that converts a physical quantity into an electric signal such as a sound sensor typified by a microphone, an acceleration sensor, a tilt sensor, an infrared sensor, a depth sensor, a temperature sensor, a humidity sensor, and the like. The input device 915 may be, for example, a remote control device utilizing infrared rays or other radio waves, or an external connection device 927 such as a mobile phone compatible with the operation of the information processing device 900. The input device 915 includes an input control circuit that generates an input signal based on the information inputted by the user or the detected physical quantity and outputs the input signal to the CPU 901. By operating the input device 915, the user inputs various data and instructs operations to the information processing device 900.

The output device 917 is a device capable of visually or audibly informing the user of the obtained information. The output device 917 may be, for example, a display such as an LCD, PDP, or OLED, etc., a sound output device such as a speaker and headphones, and a printer. The output device 917 outputs the results of processing by the information processing unit 900 as text, video such as images, or sound such as audio.

The storage device 919 is a device for storing data configured as an example of a storage unit of the information processing equipment 900. The storage device 919 is, for example, a magnetic storage device such as a hard disk drive (HDD), a semiconductor storage device, an optical storage device, or an optical magnetic storage device. This storage device 919 stores programs executed by the CPU 901, various data, and various data obtained from external sources.

The drive 921 is a reader/writer for a removable recording medium 923 such as a magnetic disk, an optical disk, a photomagnetic disk, or a semiconductor memory, and is built in or externally attached to the information processing device 900. The drive 921 reads information recorded in the mounted removable recording medium 923 and outputs it to the RAM 905. Further, the drive 921 writes record in the attached removable recording medium 923.

The connection port 925 is a port for directly connecting a device to the information processing device 900. The connection port 925 may be, for example, a USB (Universal Serial Bus) port, an IEEE1394 port, an SCSI (Small Computer System Interface) port, or the like. Further, the connection port 925 may be an RS-232C port, an optical audio terminal, an HDMI (registered trademark) (High-Definition Multimedia Interface) port, or the like. By connecting the external connection device 927 to the connection port 925, various data can be exchanged between the information processing device 900 and the external connection device 927.

The communication device 929 is, for example, a communication interface formed of a communication device for connecting to the network NW. The communication device 929 may be, for example, a communication card for a wired or wireless LAN (Local Area Network), Bluetooth (trademark), or WUSB (Wireless USB). Further, the communication device 929 may be a router for optical communication, a router for ADSL (Asymmetric Digital Subscriber Line), a modem for various communications, or the like. The communication device 929 transmits and receives signals and the like over the Internet or to and from other communication devices using a predetermined protocol such as TCP/IP. The communication network NW connected to the communication device 929 is a network connected by wire or wirelessly, and is, for example, the Internet, home LAN, infrared communication, radio wave communication, satellite communication, or the like. The communication device 929 realizes a function as a communication unit.

The image capturing device (not shown) is an imaging element such as a CCD (Charge Coupled Device) or CMOS (Complementary Metal Oxide Semiconductor), and a device that captures an image of the real space using various elements such as lenses for controlling image formation of a subject on the imaging element to generate the captured image. The image capturing device may capture a still image or may capture a moving image.

The configuration and operation of the live streaming system 1 in the embodiment have been described. This embodiment is a mere example, and it is understood by those skilled in the art that various modifications are possible for each component and a combination of each process, and that such modifications are also within the scope of the present disclosure.

The present disclosure can motivate gifting behavior with the best moment type gift. The best moment gift not only enables the gift effect to be displayed in the live stream in a real time manner, but also enables the generation of the best moment video. The best moment video enables an improved recording of the reaction of the distributor (or the interaction between the distributor and the viewer) during the gift effect of the best moment gift. The best moment video enables further subsequent interaction between the distributor and the gifting viewer (or interaction between the distributor and other viewers).

In the above embodiment, an effect of a gift is shown during a live stream in a manner and an effect of the same gift is shown in the corresponding mix video in another, different manner. To accomplish this, in some embodiments, the gift DB may associatively store a gift ID, award points, price points, best moment tag, first effect link, second effect link. If the gift DB is referred to look for an effect to be shown during the live stream, then the first effect link is provided. If the gift DB is referred to look for an effect to be shown in the mix video, the second effect link is provided. The effect provided by the first effect link and the effect provided by the second effect link are both directed to the same gift; however, the former could be different from the latter in appearance and/or duration.

The processing and procedures described in the present disclosure may be realized by software, hardware, or any combination of these in addition to what was explicitly described. For example, the processing and procedures described in the specification may be realized by implementing a logic corresponding to the processing and procedures in a medium such as an integrated circuit, a volatile memory, a non-volatile memory, a non-transitory computer-readable medium and a magnetic disk. Further, the processing and procedures described in the specification can be implemented as a computer program corresponding to the processing and procedures, and can be executed by various kinds of computers.

Furthermore, the system or method described in the above embodiments may be integrated into programs stored in a computer-readable non-transitory medium such as a solid state memory device, an optical disk storage device, or a magnetic disk storage device. Alternatively, the programs may be downloaded from a server via the Internet and be executed by processors.

Although technical content and features of the present disclosure are described above, a person having common knowledge in the technical field of the present disclosure may still make many variations and modifications without disobeying the teaching and disclosure of the present disclosure. Therefore, the scope of the present disclosure is not limited to the embodiments that are already disclosed, but includes another variation and modification that do not disobey the present disclosure, and is the scope covered by the patent application scope.

LIST OF REFERENCE NUMBERS

1 communication system
10 server 20 user terminal
30, 30a, 30b user terminal
LV distributor
AU1, AU2 viewer
VD, VD1, VD2 video image
NW network
30 user terminal
100 distribution unit
102 image capturing control unit
104 audio control unit
106 video transmission unit
108 distributor-side UI control unit
200 viewing unit
202 viewer-side UI control unit
204 superimposed information generation unit
206 input information transmission unit
302 distribution information providing unit
304 relay unit
306 gift processing unit
308 payment processing unit
310 stream DB
312 user DB
314 gift DB
330 video processing unit
350 effect DB
352 mix video DB
382, 384 CDN
CD countdown message
S1 screen
GF gift effect
MV mix video
O1, O2, O3, O4 selection object
S800, S802, S804, S806, S808, S810, S812, S814, S816, S818, S820 step
S1508, S1514 step
900 information processing device
901 CPU
903 ROM
905 RAM
907 host bus
909 bridge
911 external bus
913 interface
915 input device
917 output device
919 storage device
921 drive
923 removable recording medium
925 connection port
927 external connection device
929 communication device

What is claimed is:

1. A method for video processing, executed by a server, comprising:
receiving a gifting signal from a user terminal;
obtaining a first video of a distributor from a first timing in response to receiving the gifting signal;
determining a gift included in the gifting signal belongs to a best moment gift through checking a best moment tag;
displaying an effect corresponding to the gifting signal directly in the first video of the distributor when the gift is determined not belonging to the best moment gift, where the effect is allowed to over a distributor's face in the first video of the distributor; and
generating a second video by overlapping an effect corresponding to the gifting signal onto the first video at a second timing when the gift is determined belonging to the best moment gift, where a face portion of the distributor in the first video is detected, and a position, a transparency, or a shape of the effect is adjusted to prevent the distributor's face from being covered by the effect,
wherein the second timing is later than the first timing.

2. The method according to claim 1, wherein a length of the second video is the same as a length of the first video.

3. The method according to claim 1, further comprising:
storing the second video in a second address different from a first address from which the first video is obtained; and
informing the user terminal about the second address.

4. The method according to claim 1, further comprising:
displaying the second video in a live stream of the distributor on the user terminal.

5. The method according to claim 1, further comprising:
enabling the user terminal to display a countdown message indicating upcoming of the effect in response to receiving the gifting signal.

6. The method according to claim 1, further comprising:
storing the second video in a database in association with the distributor,
wherein the database stores data for a clip page, a post page, or a private message page of the distributor.

7. A system for video processing, comprising one or a plurality of processors, wherein the one or plurality of processors execute a machine-readable instruction to perform:
receiving a gifting signal from a user terminal;
obtaining a first video of a distributor from a first timing in response to receiving the gifting signal;
determining whether a gift included in the gifting signal belongs to a best moment gift through checking a best moment tag;
displaying an effect corresponding to the gifting signal directly in the first video of the distributor when the gift is determined not belonging to the best moment gift, where the effect is allowed to cover a distributor's face in the first video of the distributor; and
generating a second video by overlapping an effect corresponding to the gifting signal onto the first video at a second timing when the gift is determined belonging to the best moment gift, where a face portion of the distributor in the first video is detected, and a position, a transparency, or a shape of the effect is adjusted to prevent the distributor's face from being covered by the effect,
wherein the second timing is later than the first timing.

8. A non-transitory computer-readable medium including a program for video processing, wherein the program causes one or a plurality of computers to execute:
receiving a gifting signal from a user terminal;
obtaining a first video of a distributor from a first timing in response to receiving the gifting signal;
determining whether a gift included in the gifting signal belongs to a best moment gift through checking a best moment tag,
displaying an effect corresponding to the gifting signal directly in the first video of the distributor when the gift is determined not belonging to the best moment gift, where the effect is allowed to cover a distributor's face in the first video of the distributor; and
generating a second video by overlapping an effect corresponding to the gifting signal onto the first video at a second timing when the gift is determined belonging to the best moment gift, where a face portion of the distributor in the first video is detected, and a position, a transparency, or a shape of the effect is adjusted to prevent the distributor's face from being covered by the effect,
wherein the second timing is later than the first timing.

* * * * *